United States Patent [19]
King et al.

[11] Patent Number: 5,610,490
[45] Date of Patent: Mar. 11, 1997

[54] TORQUE SHUDDER PROTECTION DEVICE AND METHOD

[75] Inventors: Robert D. King, Schenectady, N.Y.; Rik W. A. A. De Doncker, Malvern, Pa.; Paul M. Szczesny, Ballston Lake, N.Y.

[73] Assignee: General Electric Company, Schenectady, N.Y.

[21] Appl. No.: 548,064

[22] Filed: Oct. 25, 1995

[51] Int. Cl.$^6$ .................................................. H02P 5/408
[52] U.S. Cl. .................... 318/611; 318/139; 318/448; 318/807
[58] Field of Search .......................... 318/611, 629, 318/139, 432, 433, 434, 448, 460, 727, 798, 799, 800, 806, 807; 388/903

[56] References Cited

U.S. PATENT DOCUMENTS

| | | | |
|---|---|---|---|
| 4,633,982 | 1/1987 | Swigert | 318/460 X |
| 4,963,804 | 10/1990 | Geiger | 318/460 |
| 4,968,925 | 11/1990 | De Doncker | 318/727 |
| 5,144,216 | 9/1992 | De Doncker | 318/807 |
| 5,166,593 | 11/1992 | De Doncker et al. | 318/800 |
| 5,301,522 | 4/1994 | Ikemizu et al. | |
| 5,469,820 | 11/1995 | Data et al. | |
| 5,534,764 | 7/1996 | Masaki et al. | 318/802 |

*Primary Examiner*—Bentsu Ro
*Attorney, Agent, or Firm*—Ann M. Agosti; Marvin Snyder

[57] ABSTRACT

A torque shudder protection device for an induction machine includes a flux command generator for supplying a steady state flux command and a torque shudder detector for supplying a status including a negative status to indicate a lack of torque shudder and a positive status to indicate a presence of torque shudder. A flux adapter uses the steady state flux command and the status to supply a present flux command identical to the steady state flux command for a negative status and different from the steady state flux command for a positive status. A limiter can receive the present flux command, prevent the present flux command from exceeding a predetermined maximum flux command magnitude, and supply the present flux command to a field oriented controller. After determining a critical electrical excitation frequency at which a torque shudder occurs for the induction machine, a flux adjuster can monitor the electrical excitation frequency of the induction machine and adjust a flux command to prevent the monitored electrical excitation frequency from reaching the critical electrical excitation frequency.

22 Claims, 5 Drawing Sheets

TORQUE SHUDDER PROTECTION DEVICE AND METHOD

The invention was made with Government support under contract number DEAC07-901D13019 awarded by the Department of Energy. The Government has certain rights in the invention.

BACKGROUND OF THE INVENTION

1. Field of the Invention

This invention relates generally to electric vehicles, and more particularly to controls for AC adjustable speed drives.

2. Description of the Related Art

Conventional electric vehicles are designed to achieve high efficiency. For example, low loss tires are used to reduce rolling friction, and single speed transmissions are chosen over multiple speed automatic transmissions. Conventional electric motors operate at high speeds and therefore require large numeric gear reductions. The electric drives required for high performance electric vehicles have large starting torque and high power.

Vehicle power trains exhibit driveline oscillations that occur at the eigen frequencies (characteristic frequencies of the mechanical systems) and multiples of the eigen frequencies of mechanical vehicle components such as gears, shafts, constant velocity joints, motor mounts, and vehicle suspension systems. Driveline mechanical natural frequencies for cars and small trucks typically occur in the range of four hertz to seven hertz. Electric drive systems, especially AC drive systems, often produce small torque pulsations that are related to the electrical excitation frequency. At certain motor speed and torque operating points, the electrical excitation frequency, and therefore the torque pulsation frequency, aligns with the eigen frequencies of the mechanical system and produces a sustained, self-excited driveline oscillation that will hereinafter be referred to as torque shudder.

During low speed operations such as one to three miles per hour in a parking lot, efficiency improvement factors require the drive to operate at torque levels of one to three percent of its maximum rated torque. While operating the drive at one percent of rated maximum torque and two to three percent of maximum speed, it is difficult to avoid producing torque pulsations on the order of ±0.5 lb-ft that would sustain torque shudder.

Even if a drive could be tuned to suppress torque pulsation below the ±0.5 lb-ft level, it is unlikely that drives with component and parameter variations could be mass-produced in large quantities that would maintain this exceptional torque smoothness because precision fabrication of such drives would be difficult due to offsets, errors, and temperature variations which create problems such that each drive would need to be specially calibrated.

SUMMARY OF THE INVENTION

The present invention includes a system for detecting or predicting the occurrence of torque shudder and supplying appropriate commands to the field oriented vector control to allow the same torque to be produced with a shift in the electrical excitation frequency (and therefor the frequency of the low-level torque pulsations from the electric drive) to a different frequency that does not excite the very high "Q" (figure of merit equal to the drive system's resonant frequency divided by bandwidth) mechanical system and thereby reduce torque shudder.

Briefly, in accordance with one embodiment of the present invention, a torque shudder protection device for an induction machine may comprise a flux command generator for supplying a steady state flux command and a torque shudder detector for supplying a status comprising a negative status (logic value 0) to indicate a lack of torque shudder and a positive status (logic value 1) to indicate a presence of torque shudder. A flux adapter uses the steady state flux command and the status to supply a present flux command identical to the steady state flux command for a negative status and different from the steady state flux command for a positive status. A limiter can receive the present flux command, prevent the present flux command from exceeding a predetermined maximum flux command magnitude, and supply the present flux command to a field oriented controller. After determining a critical electrical excitation frequency at which a torque shudder occurs for the mechanical system of the induction machine, the flux adapter can monitor the electrical excitation frequency of the induction machine and adjust a flux command to prevent the monitored electrical excitation frequency from reaching the critical electrical excitation frequency.

BRIEF DESCRIPTION OF THE DRAWINGS

The features of the invention believed to be novel are set forth with particularity in the appended claims. The invention itself, however, both as to organization and method of operation, together with further objects and advantages thereof, may best be understood by reference to the following description taken in conjunction with the accompanying drawings, where like numerals represent like components, in which:

DETAILED DESCRIPTION OF PREFERRED EMBODIMENTS OF THE INVENTION

Figure 1:
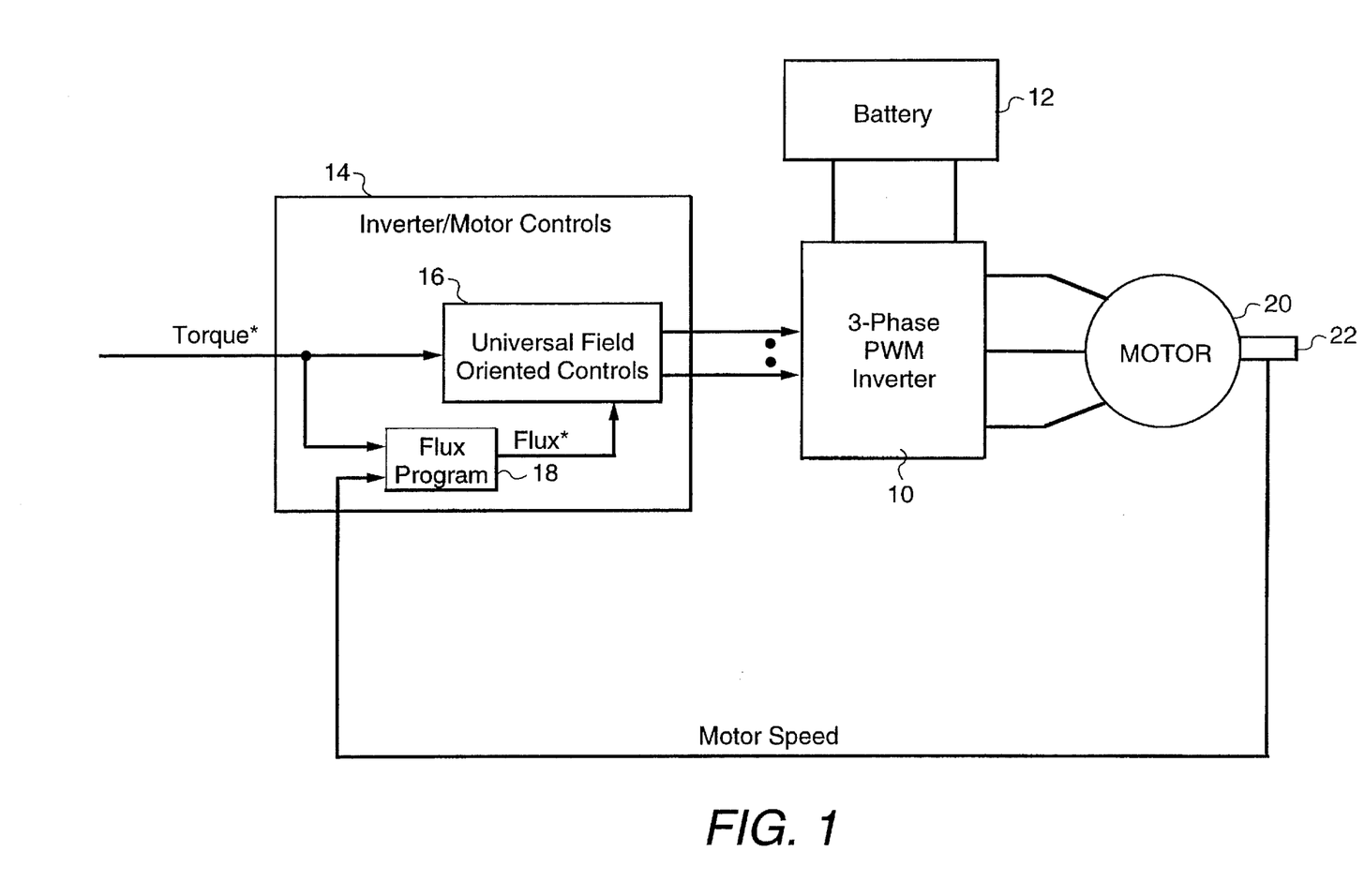
FIG. 1 is a block diagram of an electric drive system.

FIG. 1 is a block diagram of an electric drive system including a multiple phase pulse width modulating (PWM) inverter, shown as three-phase PWM inverter 10, an energy storage device, shown as battery 12, and inverter/motor controls 14 for a motor 20. A universal field-oriented (UFO) controller 16, such as described in commonly assigned DeDoncker, U.S. Pat. No. 4,968,925, which is herein incorporated by reference, can be used in combination with a flux command generator 18 which can compute the desired, steady state motor flux command with the values of a motor torque command and motor speed sensed by a motor speed sensor 22. For example, commonly assigned DeDoncker, U.S. Pat. No. 5,144,216, which is herein incorporated by reference, describes a method for processing components of flux in a direct field orientation scheme to provide flux amplitude and angular position values (the steady state flux command) for use in the UFO controller. The steady state flux command is calculated so as to optimize steady state efficiency. Motor speed sensor 22 may comprise a quadrature tachometer, for example, which can determine motor speed and direction.

Torque shudder is characterized by a sustained rocking motion or wind-up followed by a wind-down of the transaxle about its elastic mounting system. Torque shudder produces a rapid deceleration of the instantaneous rotor speed with respect to the motor stator while the vehicle is operating at constant speed or during low level accelerations.

Figure 2:
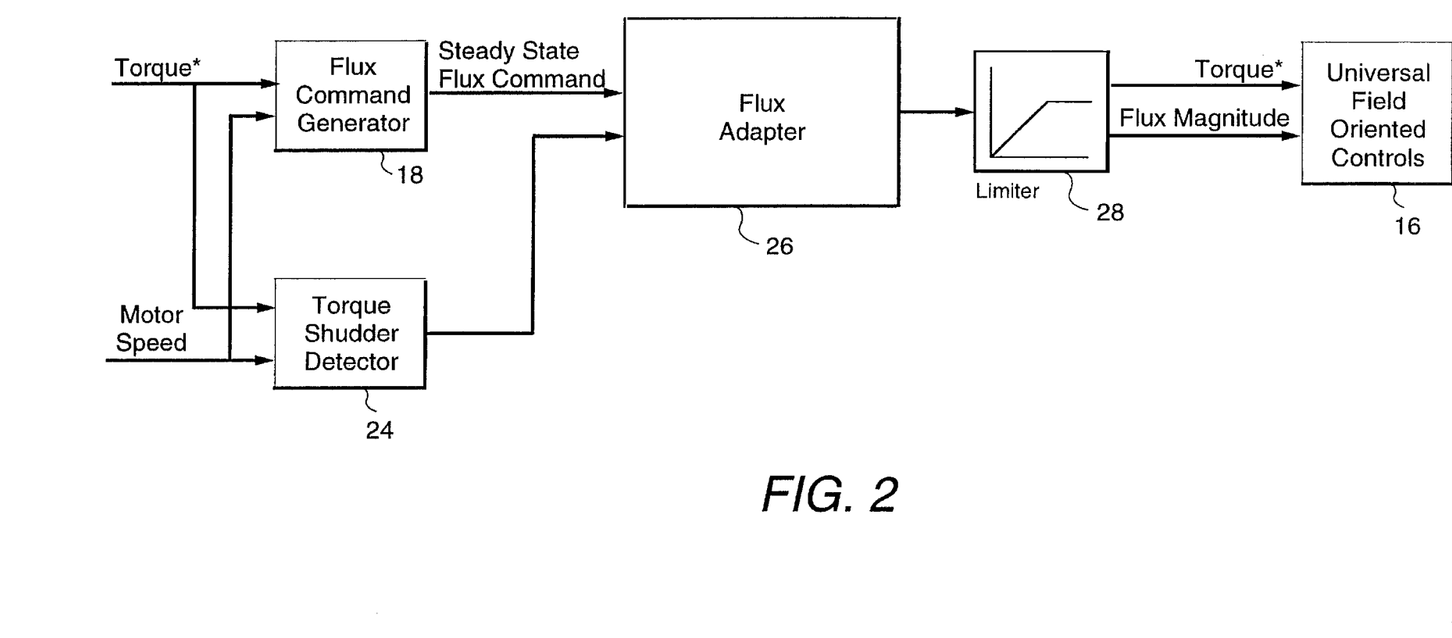
FIG. 2 is a block diagram of a portion of an electric drive system according to one embodiment of the present invention.

FIG. 2 is a block diagram of a portion of an electric drive system according to one embodiment of the present invention. A torque shudder detector 24 determines whenever a sudden motor deceleration occurs during periods of constant speed or low vehicle acceleration where the torque command is a small positive value within a given threshold and the average motor speed is also at a relatively low speed (rpm) within a second threshold as follows if (D>X) and (T<Y) and (AMS<Z), then TS, wherein D represents motor deceleration, T represents torque, AMS represents average motor speed, TS represents torque shudder, and X, Y, and Z represent thresholds which are dependent on the particular type of motor and mechanical system.

The torque shudder detector supplies a status comprising a negative status (logic value 0) to indicate a lack of torque shudder and a positive status (logic value 1) to indicate a presence of torque shudder. The output signal of the torque shudder detector is input to a flux adapter 26. Preferably, if the vehicle speed exceeds a respective vehicle speed threshold (i.e., a speed above which torque shudders are not expected to occur), then the torque shudder detector is disabled until the vehicle speed drops to its respective threshold.

Figure 3:
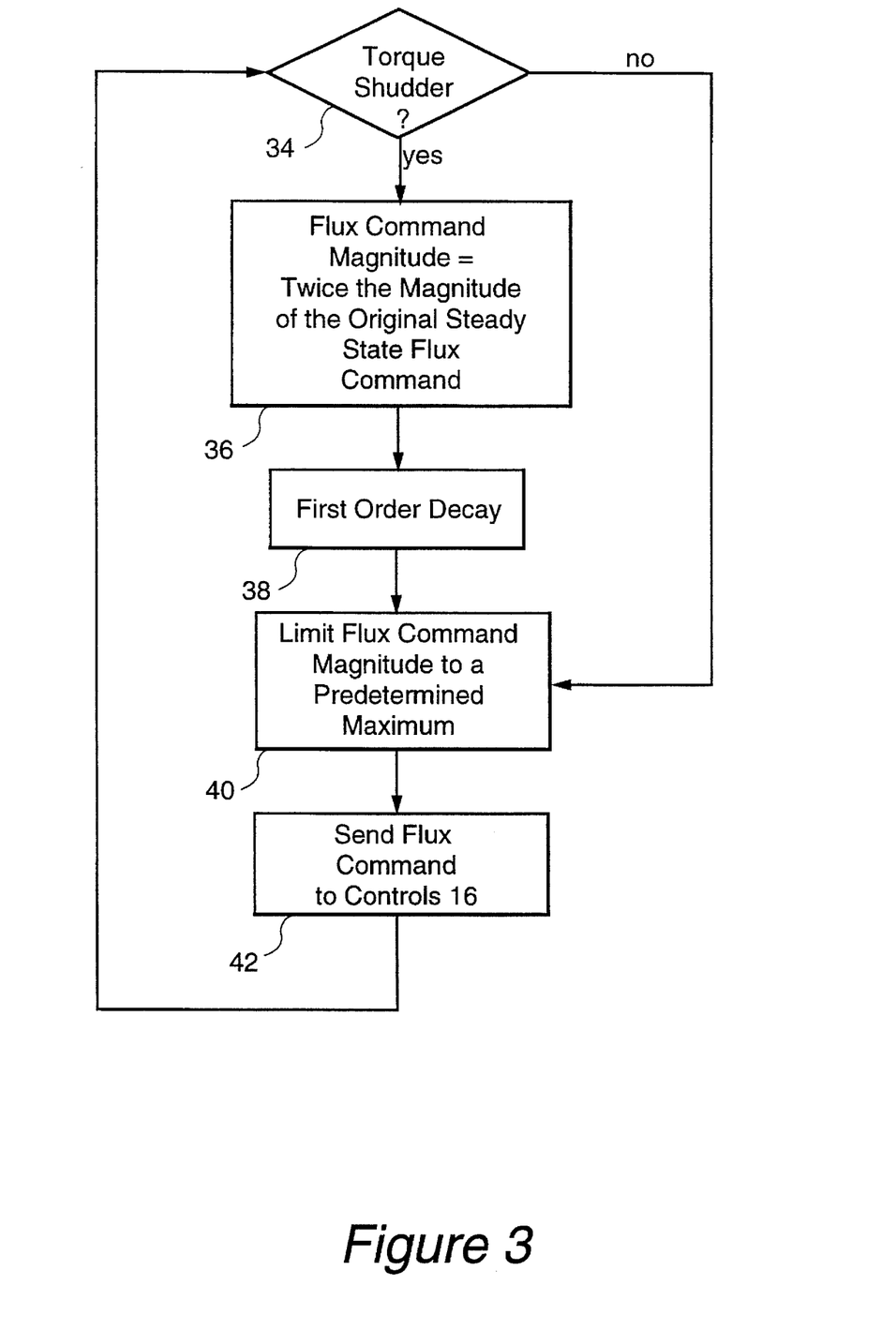
FIGS. 3–5 are flow charts illustrating techniques for implementing a drive system such as the one shown in FIG. 2.
Figure 4:
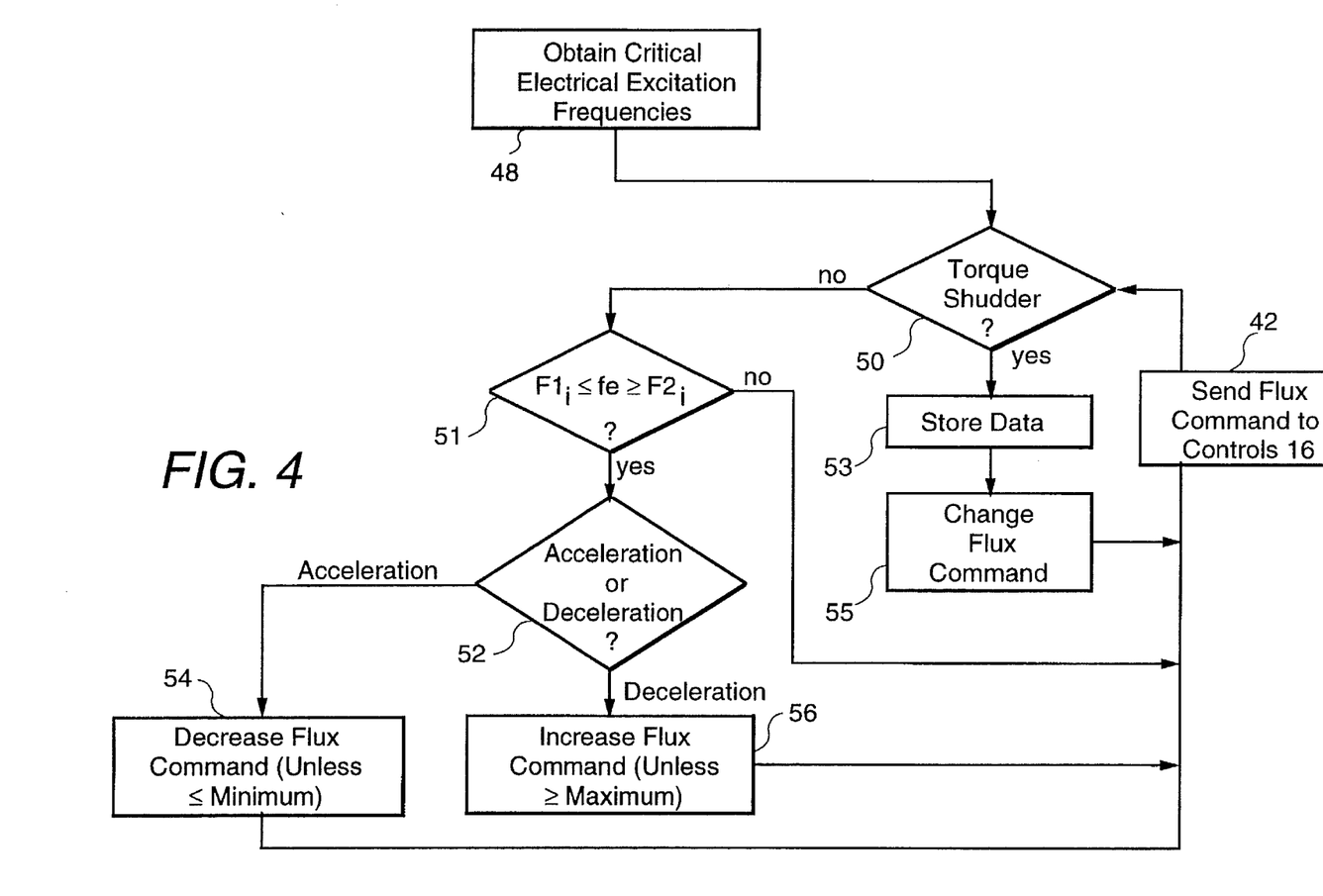
Figure 5:
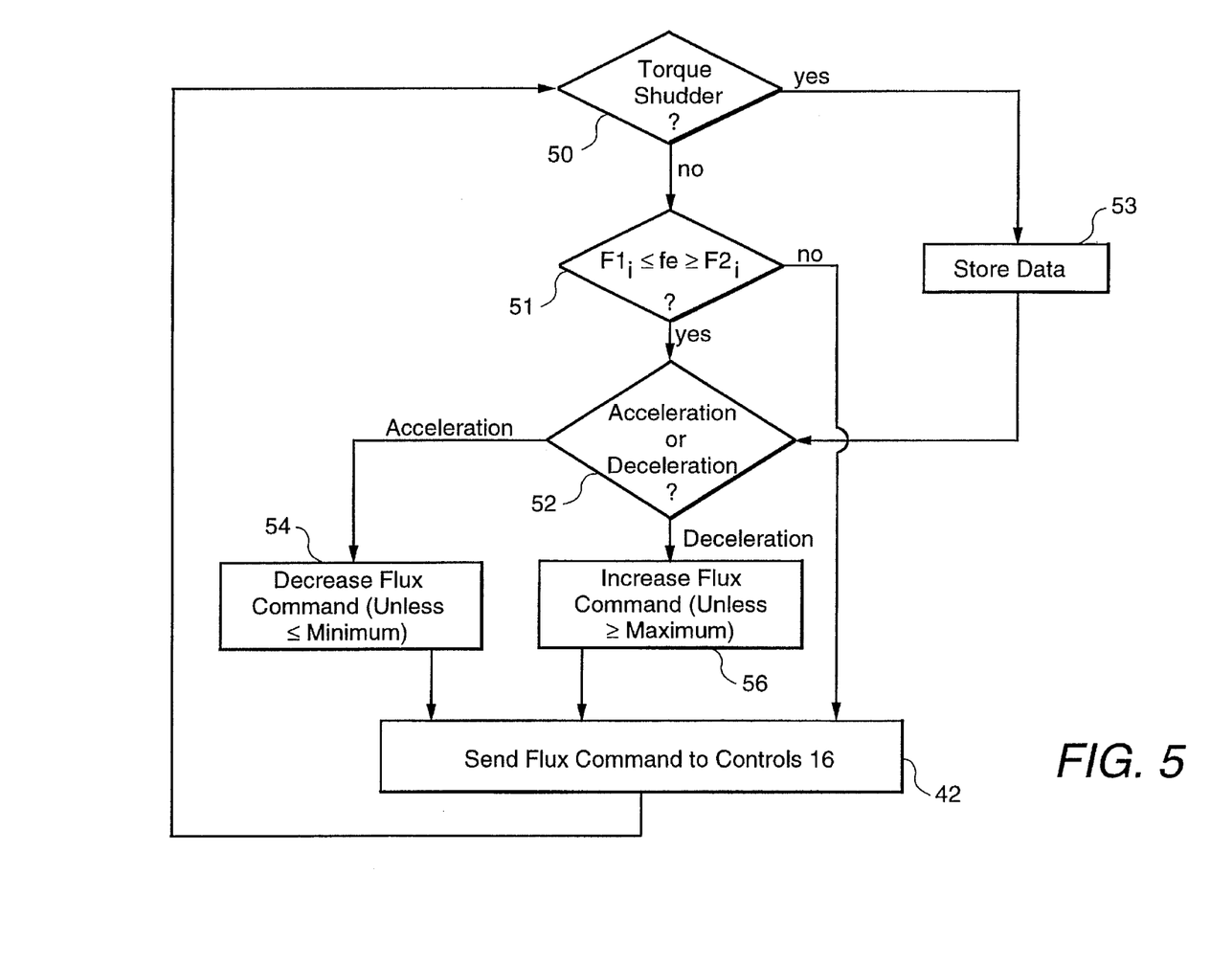

FIGS. 3–5 are flow charts illustrating techniques for implementing a drive system such as the one shown in FIG. 2. The steps of each of these flow charts can be accomplished using either analog elements or a digital computer. Briefly, the embodiment of FIG. 3 is a reaction technique wherein torque shudder occurrences are detected and adjustments are made to stop each occurrence. The embodiment of FIG. 4 expands on that of FIG. 3 by initially storing the critical electrical frequencies at which torque shudders have been found to occur, and, in addition to continuing to test for new occurrences, monitors whether the electrical excitation frequency is approaching the critical electrical excitation frequency and adjusts accordingly. The embodiment of FIG. 5 uses adjustment techniques similar to those of FIG. 4 but does not include an initial data gathering step.

In FIG. 3, at step 34 it is determined whether a torque shudder has been detected. If no torque shudder has been detected and a logic value 0 is therefore generated, the flux adapter responds to the logic 0 signal by passing the present value of the flux command generator (the magnitude of the steady state flux command) through limiter 28, which receives the output signal of flux adapter 26, at step 40 to prevent a flux command that exceeds the maximum allowed flux. If the flux command exceeds the maximum allowed flux, the present command is limited accordingly before being supplied to field-oriented controls 16 at step 42, and the process begins again.

The flux adapter responds to a torque shudder detection (a logic 1 value) signal at step 36 by creating a magnitude of an adapted, present flux command signal that is instantaneously increased. In one embodiment, the flux command signal is increased to approximately twice the magnitude of the original steady state flux command signal (the most recent flux command prior to the torque shudder detection), followed by a slow first order decay at step 38 with a duration of several (approximately five) seconds. Then steps 40 and 42 proceed as discussed above with respect to the situation wherein no torque shudder was detected.

The universal field-oriented controls 16 of FIG. 1 operate the drive system to produce the same torque at this new higher level present flux command as the torque that was produced before the flux was increased. For a high flux operating situation, the increase in flux causes the slip frequency to be decreased and therefore the electrical excitation frequency of the motor is decreased. The frequencies of torque pulsations of the drive related to the electrical excitation frequency are also decreased, or shifted away from the mechanical eigen frequencies, thus eliminating excitation of the mechanical frequency at its natural frequency.

During normal vehicle acceleration, this method will reduce sustained torque shudder. In the unlikely event that the vehicle speed and torque commands are identical to their previous respective steady state commands during the decay of the flux adapter, then the electrical excitation frequency will again be identical with the eigen frequency of the mechanical system. The torque shudder detector will trigger after a single oscillation has occurred and output a logic 1 signal, after which the process will repeat. This may result in periodic spikes but will prevent continuous oscillations.

FIG. 4 illustrates an embodiment wherein the value of the electrical excitation frequency at which each respective detection has been stored to obtain critical excitation frequencies at step 48. Monitoring and storing can be performed while using steps 34–42 of FIG. 3 to adjust electrical frequencies during an initial time period, for example. The flux adapter 26 (shown in FIG. 2) can then be programmed to avoid these particular excitation frequencies and thereby reduce further torque shudder occurrences.

In the embodiment of FIG. 4, occurrences of torque shudder continue to be detected at step 50. If no torque shudder is detected, it is determined at step 51 whether the electrical excitation frequency (fe) of the motor falls within any frequency danger range. A frequency danger range is any electrical excitation frequency value (or any range of values) for which a torque shudder detection has previously occurred, preferably with the addition of a safety margin on either side of the frequency value (or range of values). The safety margins can be determined by experimental tests and are expected to be on the order of 0.5–1 Hz. For example, if a torque shudder was detected at 2 Hz, the frequency range (f1 to f2) of one embodiment can be 1.5 Hz to 2.5 Hz.

For small motors, a protection system would generally only require monitoring of a base eigen frequency because, even if multiples do exist, torque shudder amplitudes decrease at higher frequencies. Significant multiples of an eigen frequency can exist, though, especially for large motors, and these motors may require a plurality of frequency ranges be evaluated. In such applications a plurality of torque shudder frequency ranges are present, and each range $f1_i$ to $f2_i$ should be checked.

In the event that a torque shudder is detected at step 50, the electrical excitation frequency is stored at step 53 for further use. Several options are then available for changing the flux command at step 55. For example, a process such as described with respect to the embodiment FIG. 3 can be used to appropriately change the flux command magnitude, and the torque shudder detection process can then be repeated. In another example a method such as described below with respect to steps 52, 54, and 56 can be followed.

At step 52, if the electrical excitation frequency fe is within the range of any $f1_i$ to $f2_i$, it is determined whether the motor is accelerating or decelerating.

If the motor speed is increasing when a torque shudder occurs or when the electrical excitation frequency becomes within a potential danger range, it is possible to stop an occurring shudder or eliminate the potential reoccurrence of the torque shudder by rapidly lowering the present flux command to "jump" over the frequency danger range.

In one embodiment at step 54 the present flux command is lowered by a predetermined amount or percentage, which can be 50%, for example, (provided that the flux command does not become less than a predetermined minimum flux command magnitude). Before the present flux command is lowered and sent through limiter 28 to universal field oriented controls 16, it is determined whether lowering the flux command by the predetermined amount or percentage would result in a flux command being less than a predetermined minimum flux command magnitude. If such result would occur, then either the flux command can be set to that minimum flux command magnitude or a process such as described with respect to steps 36–42 of FIG. 3 can be used to adjust the flux command.

When the flux is decreased, the slip frequency increases which leads to an increased electrical excitation frequency that becomes higher than the upper boundary $f2_i$ of the frequency danger range and thus is higher than the eigen frequency at which torque shudder occurs.

Similarly, when the speed of the motor is decreasing, at step 56 it is possible to stop an occurring shudder or eliminate the potential reoccurrence of the torque shudder by rapidly raising the present flux command. In one embodiment at step 56 the present flux command is raised by a predetermined amount or percentage such as 50%, for example. At step 56 it is determined whether raising the flux command by the predetermined amount or percentage would result in a flux command being greater than a predetermined maximum flux command magnitude. If so, then the flux command can be set to that maximum flux command magnitude.

When the present flux command is increased, the electrical excitation frequency falls below the lower boundary $f1_i$ of the frequency danger range and thus below the mechanical eigen frequency of the vehicle. Using this technique, the electrical excitation frequency "jumps over" the mechanical eigen frequency, and torque shudder occurrences can be reduced.

FIG. 5 is similar to that of FIG. 4 except for the absence of the initial step of obtaining critical electrical excitation frequencies. Instead, in FIG. 5, torque shudder occurrences are monitored by step 50 and frequencies are monitored at step 51 before any critical excitation frequencies have been stored. In this case, a default set of $f1_i$ and $f2_i$ can be set to zero and then changed upon the first detection of a torque shudder. Otherwise steps 51, 52, 54, and 56 proceed in the same manner as discussed with respect to FIG. 4.

When a torque shudder is detected at step 50, the critical electrical excitation frequency is stored at step 53, the acceleration/deceleration determination is made at step 52, and the flux command is adjusted accordingly at step 54 or 56, respectively as discussed with respect to FIG. 4. An assumption is made that frequency ranges for with torque shudders occur are sufficiently narrow such that when a motor speed is increasing, for example, the decreased flux and corresponding increased electrical excitation frequency will be sufficient to jump over the critical electrical excitation frequency or frequency range (even if boundaries for a particular range are as of yet undetermined).

The embodiments of FIGS. 4 and 5 both require more memory and logic circuitry than the embodiment of FIG. 3. The ability to prevent certain torque shudders from occurring, however, can be very useful in certain applications. Additionally, the embodiments of FIGS. 4 and 5 can be used under conditions of either acceleration or deceleration, whereas the embodiment of FIG. 3 requires acceleration.

Under conditions wherein motor speed is increasing and low amplitude positive torque is present, if the steady state flux command is already too low (i.e. the slip frequency is too high), the flux cannot be further lowered without the occurrence of torque pull-out (which results when the flux field is so weak that it cannot support the torque). When a torque shudder is detected in such instances, the flux command can be rapidly increased (in contrast to the decrease discussed with respect to step 54 of FIGS. 4 and 5). If the torque shudder detector is slow to respond, such slowness may indicate conditions of high slip frequency. Therefore, if in any of the embodiments of FIGS. 3–5 the duration of a torque shudder occurrence during acceleration appears lengthy (greater than about 1 second, for example), an increase in the flux may reduce the torque shudder. In one embodiment the flux increase is by a factor of about fifty percent.

While only certain preferred features of the invention have been illustrated and described herein, many modifications and changes will occur to those skilled in the art. It is, therefore, to be understood that the appended claims are intended to cover all such modifications and changes as fall within the true spirit of the invention.

What is claimed is:

1. A torque shudder protection device for an induction machine, the device comprising:

a flux command generator for supplying a steady state flux command;

a torque shudder detector for supplying a status comprising a negative status to indicate a lack of torque shudder and a positive status to indicate a presence of torque shudder, a flux adapter for using the steady state flux command and the status to supply a present flux command identical to the steady state flux command for a negative status and different from the steady state flux command for a positive status; and a limiter for receiving the present flux command, preventing the present flux command from exceeding a predetermined maximum flux command magnitude, and supplying the present flux command to a field oriented controller.

2. The device of claim 1, wherein the torque shudder detector includes a motor speed sensor; and means for estimating a motor torque value, determining whether a motor speed value is below a motor speed threshold value, and determining whether the motor torque value is below a motor torque threshold value.

3. The device of claim 1, wherein the flux adapter includes means for increasing the steady state command to create the present flux command.

4. The device of claim 3, wherein the flux adapter further includes means for applying a first order decay to the increased present flux command.

5. A torque shudder protection device for an induction machine, the device comprising:

a torque shudder detector for determining a critical electrical excitation frequency at which a torque shudder occurs for the induction machine;

a flux adjuster for monitoring the electrical excitation frequency of the induction machine and adjusting a flux command to prevent the monitored electrical excitation frequency from reaching the critical electrical excitation frequency.

6. The device of claim 5, wherein the flux adjuster includes:

means for determining whether the monitored electrical excitation frequency is within a frequency danger range, the frequency danger range including the critical electrical excitation frequency;

means for determining whether a motor speed of the induction machine is increasing or decreasing;

means for, if the monitored electrical excitation frequency is within the range and the motor speed is increasing, decreasing the flux command to create an electrical excitation frequency above an upper boundary of the frequency danger range; and means for, if the monitored electrical excitation frequency is within the range and the motor speed is decreasing, increasing the flux command to create an electrical excitation frequency below a lower boundary of the frequency danger range.

7. The device of claim 6, wherein the flux adjuster further includes, means for, if a torque shudder is detected, adjusting the flux command to remove the torque shudder and storing a corresponding additional critical excitation frequency.

8. A torque shudder protection device for an induction machine, the device comprising:

a flux command generator for supplying a steady state flux command;

a torque shudder detector for supplying a status comprising a negative status to indicate a lack of torque shudder and a positive status to indicate a presence of torque shudder, and for supplying a critical electrical excitation frequency in the event of a positive status;

a frequency monitor for monitoring the electrical excitation frequency of the induction machine; and a flux adjuster for adjusting the stead state flux command in the event of a positive status and for adjusting the steady state flux command to prevent the monitored electrical excitation frequency from reaching the critical electrical excitation frequency.

9. The device of claim 8, wherein the flux adjuster includes:

means for determining whether the monitored electrical excitation frequency is within a frequency danger range, the frequency danger range including the critical electrical excitation frequency;

means for determining whether a motor speed of the induction machine is increasing or decreasing;

means for, if the monitored electrical excitation frequency is within the range and the motor speed is increasing, decreasing the flux command to create an electrical excitation frequency above an upper boundary of the frequency danger range; and means for, if the monitored electrical excitation frequency is within the range and the motor speed is decreasing, increasing the flux command to create an electrical excitation frequency below a lower boundary of the frequency danger range.

10. A method of torque shudder protection for an induction machine, the method comprising the steps of:

providing a steady state flux command;

determining whether a torque shudder is occurring;

supplying a status comprising a negative status to indicate a lack of torque shudder and a positive status to indicate a presence of torque shudder;

supplying a present flux command identical to the steady state flux command for a negative status and different from the steady state flux command for a positive status; and limiting the present flux command to a predetermined maximum flux command magnitude.

11. The method of claim 10, wherein the step of determining whether a torque shudder has occurred comprises measuring a motor speed value, estimating a motor torque value, and determining whether the motor speed value is below a motor speed threshold value and whether the motor torque value is below a motor torque threshold value.

12. The method of claim 10, wherein the step of supplying the present flux command different from the steady state flux command comprises increasing the present flux command.

13. The method of claim 12, wherein the step of increasing the present flux command comprises doubling the present flux command.

14. The method of claim 13, further including applying a first order decay to the present flux command before limiting the present flux command to the predetermined maximum flux command magnitude.

15. A method of torque shudder protection for an induction machine, the method comprising the steps of:

determining a critical electrical excitation frequency at which a torque shudder occurs for the induction machine;

monitoring the electrical excitation frequency of the induction machine; and adjusting a flux command to prevent the monitored electrical excitation frequency from reaching the critical electrical excitation frequency.

16. The method of claim 15, wherein the step of adjusting the flux command to prevent the monitored electrical excitation frequency from reaching the critical electrical excitation frequency comprises:

determining whether the monitored electrical excitation frequency is within a frequency danger range, the frequency danger range including the critical electrical excitation frequency;

determining whether a motor speed of the induction machine is increasing or decreasing;

if the monitored electrical excitation frequency is within the range and the motor speed is increasing, decreasing the flux command to create an electrical excitation frequency above the critical electrical excitation frequency; and if the monitored electrical excitation frequency is within the range and the motor speed is decreasing, increasing the flux command to create an electrical excitation frequency below the critical electrical excitation frequency.

17. The method of claim 16, further including determining whether a torque shudder has occurred, and, if so, storing a corresponding additional critical excitation frequency and adjusting the flux command to remove the torque shudder.

18. The method of claim 17, wherein the step of adjusting the flux command to remove the torque shudder comprises, determining whether a motor speed of the induction machine is increasing or decreasing, if the motor speed is increasing, decreasing the flux command to create an electrical excitation frequency above the critical electrical excitation frequency, and if the motor speed is decreasing, increasing the flux command to create an electrical excitation frequency below the critical electrical excitation frequency.

19. The method of claim 18, wherein the step of adjusting the flux command to remove the torque shudder further includes determining whether the flux command is below a predetermined minimum flux command magnitude, and, if so, rapidly increasing the flux command.

20. A method of torque shudder protection for an induction machine, the method comprising the steps of:

determining whether a torque shudder has occurred, and if so, storing the electrical excitation frequency as a critical electrical excitation frequency and adjusting a flux command to remove the torque shudder; and determining whether a monitored electrical excitation frequency is sufficiently near a critical electrical excitation frequency and, if so, adjusting the flux command to prevent the monitored electrical excitation frequency from reaching the critical electrical excitation frequency.

21. The method of claim 20, wherein the step of adjusting the flux command comprises:

determining whether a motor speed of the induction machine is increasing or decreasing;

if the motor speed is increasing, decreasing the flux command to create an electrical excitation frequency above the critical electrical excitation frequency; and if the motor speed is decreasing, increasing the flux command to create an electrical excitation frequency below the critical electrical excitation frequency.

22. The method of claim 20, wherein the step of adjusting the flux command to remove the torque shudder includes determining whether the flux command is below a predetermined minimum flux command magnitude, and, if so, rapidly increasing the flux command.

* * * * *